Dec. 5, 1967    N. G. OLSEN    3,356,174
VEHICLE CONSTRUCTION
Filed May 11, 1965    2 Sheets-Sheet 1

Inventor
Norman G. Olsen
Attorney

Dec. 5, 1967   N. G. OLSEN   3,356,174
VEHICLE CONSTRUCTION
Filed May 11, 1965   2 Sheets-Sheet 2
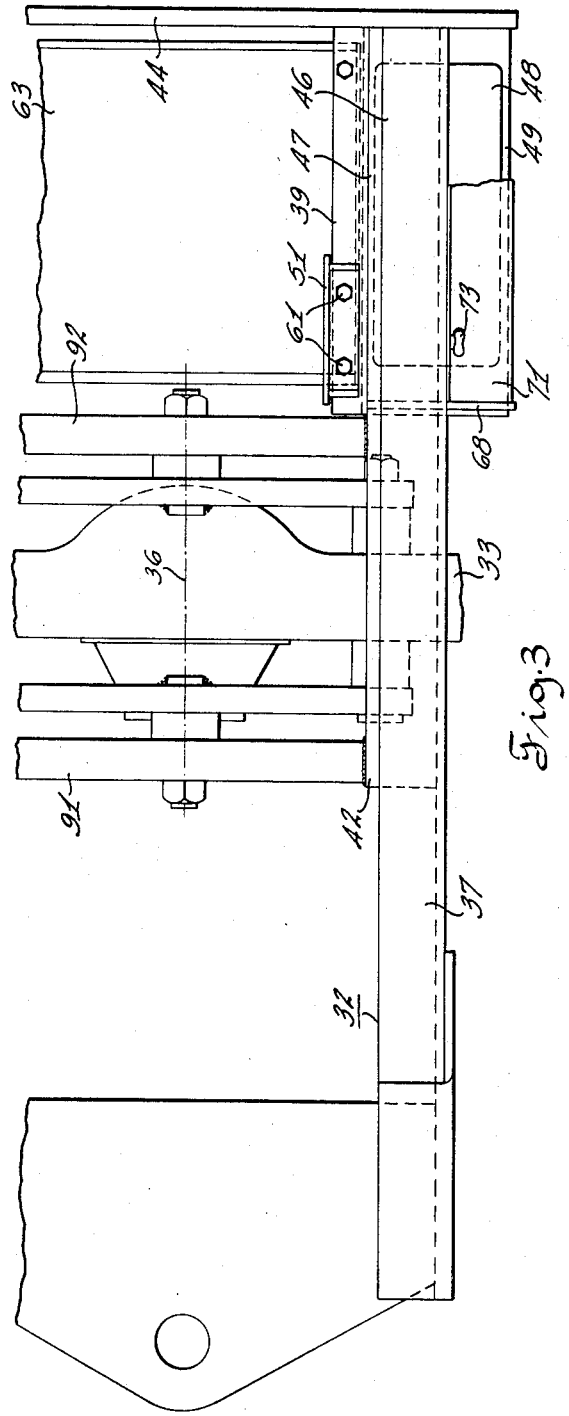
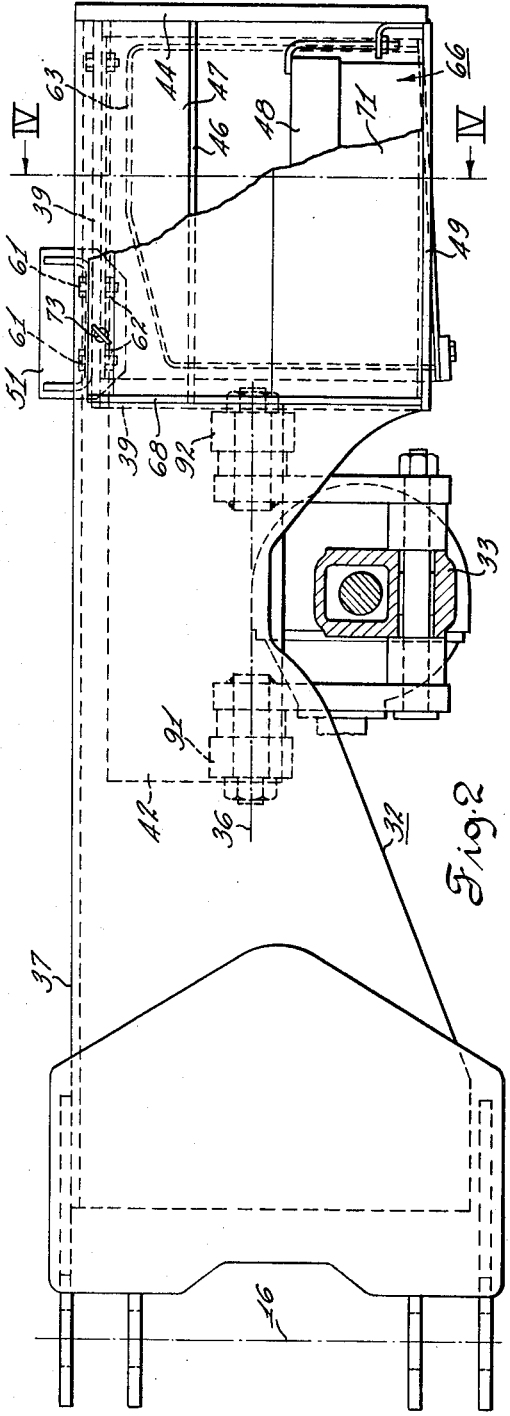
Inventor
Norman G. Olsen
By Charles E. Ashurst
Attorney United States Patent Office
3,356,174
Patented Dec. 5, 1967

3,356,174
VEHICLE CONSTRUCTION
Norman G. Olsen, Highland Park, Ill., assignor to Allis-Chalmers Manufacturing Company, Milwaukee, Wis.
Filed May 11, 1965, Ser. No. 454,904
14 Claims. (Cl. 180—68.5)

ABSTRACT OF THE DISCLOSURE

This invention relates to an improved vehicle construction and particularly to battery compartments built into the vehicle chassis. A pair of battery compartments defined in part by a pair of counterweight members, which also form an integral part of the vehicle chassis, and by a rear bumper plate. The battery compartments are at the rear of the vehicle where the batteries will serve as counterweight for the lifting tool on the front end of the vehicle. The batteries are positioned on transversely opposite sides of a fuel tank at convenient servicing height and in close proximity to the vehicle engine.

---

In designing a rubber tired front end loader the weight of the load carried by the loader bucket must be counter-balanced by weight behind the front axle of the vehicle. Heretofore, others have placed major components, such as the engine, over the rear axle of the vehicle to provide substantial counterweight. Also, heretofore various provisions have been made for adding counterweight to the rear end of the vehicle as necessary to properly balance out the vehicle for loader operations.

It is an object of the present invention to place the vehicle batteries at the rear of the vehicle where they effectively serve as counterweight and are at a convenient servicing height.

It is a further object of this invention to provide a vehicle chassis wherein inner and outer pairs of longitudinally disposed frame members are spaced from one another by counterweights and wherein battery compartments are provided beneath the counterweights.

It is a further object of this invention to provide an improved vehicle construction of the type hereinbefore outlined wherein the battery compartments are disposed on opposite lateral sides of the fuel tank and between the rear wheels of the vehicle.

It is a further object of this invention to provide a vehicle chassis having inner and outer pairs of longitudinal frame members which are spaced from one another by counterweights and wherein the inner pair of frame members are adapted to support an engine and a fuel tank in underlying relation to the engine and additionally have outwardly extending battery supports underlying the counterweights.

It is a further object of this invention to provide the vehicle structure as hereinbefore outlined wherein a bumper or bumper plate is secured at the rear of the vehicle to the frame members and counterweights so as to form end walls of the battery compartment.

It is a further object of this invention to make maximum use of the battery weight as a counterweight for the vehicle, place the batteries at a convenient height for servicing by a man standing on the ground and keep the battery compartments within the lateral space between the rear wheels of the vehicle.

These and other objects and advantages of this invention will be apparent when the following description is read in conjunction with the drawings in which:

FIG. 2 is a side view of the chassis of the rear portion of the articulated vehicle shown in FIG. 1;

FIG. 3 is a top view of the chassis shown in FIG. 2; and

Figure 1:
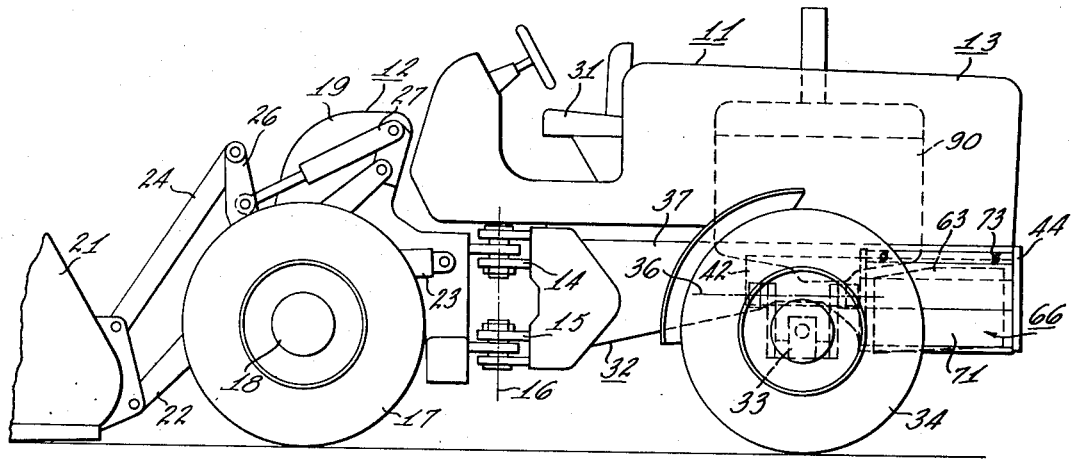
FIG. 1 is a side view of a vehicle incorporating the present invention.

The articulated loader 11 shown in FIG. 1, basically consists of a front section 12 and a rear section 13 joined together by a pair of vertically aligned pivot connections 14, 15 for articulate steering movement about a vertical axis 16. The front section 12 includes a pair of rubber tires 17, only one of which is shown, mounted on an axle 18 which is rigidly connected to the front chassis or frame 19. The front section 12 supports a bucket 21 by a suitable boom 22 which is raised and lowered by a hydraulic ram 23. The bucket 21 is pivoted about the end of the boom 22 by a suitable tilt linkage 24, 26 actuated by a hydraulic ram 27. The rear section 11 supports an operator's station 31 on the rear chassis 32 and a rear axle 33 is pivoted to the rear chassis 32 on a longitudinal axis 36. The rear axle has a pair of rubber tired wheels 34, only one of which is shown.

Referring also to the other figures of the drawings, the chassis 32 includes a first pair of longitudinally extending outer frame members 37, 38 and a second pair of frame members 39, 41 disposed laterally inwardly from and parallel to the first frame members 37, 38. The frame members 37, 38, 39, 41 are spaced from one another by spacer members in the form of longitudinally extending counterweights 42, 43 which are rigidly secured as by welding to the frame members.

As shown in FIGS. 2 and 3 the counterweights 42, 43 are disposed above the rear axle 33 and extend rearwardly to the rear end of the vehicle to the same extent as the frame members 37, 38, 39, 41 where they are rigidly welded to a vertically and transversely disposed bumper plate 44. The counterweights 42, 43 serve as structural portions of the chassis in another way, in that they support a pair of transverse beams 91, 92, secured thereto as by welding, which pivotally support the rear axle 33 for limiting swinging movement about axis 36.

The rear portion 46 of the outer frame member 37 and the rear portion 47 of counterweight 42 are of reduced vertical dimension to provide a compartment 66 for a battery 48 resting on a battery support 49 constituting a part of the inner frame member 39. Frame member 38 and counterweight 43 are similarly constructed so that battery 60 is disposed beneath counterweight 43. The inner frame member 39 extends from a position at the rear of the axle 33 rearwardly to the bumper plate 44 and is adapted to receive an engine mounting bracket 51.

Inner frame member 41 has a vertically extending wall 56 which forms the lateral inner wall of a second battery compartment 67 and has a horizontally and longitudinally extending wall 57 which forms a battery supporting bottom wall of the second battery compartment. The top of the inner frame member 41 is flanged horizontally inwardly to receive an engine supporting bracket 58. The vehicle engine 90 is rigidly secured to the brackets 51, 58 by suitable cap screws 59. Releasable fastening means in the form of bolts 61 and nuts 62 not only releasably secure the engine mounting brackets 51, 58 to the lateral inner frame components 41, 39, but also releasably support a fuel tank 63 disposed between the vertically disposed walls 55, 56 of the frame members 39, 41.

Figure 4:
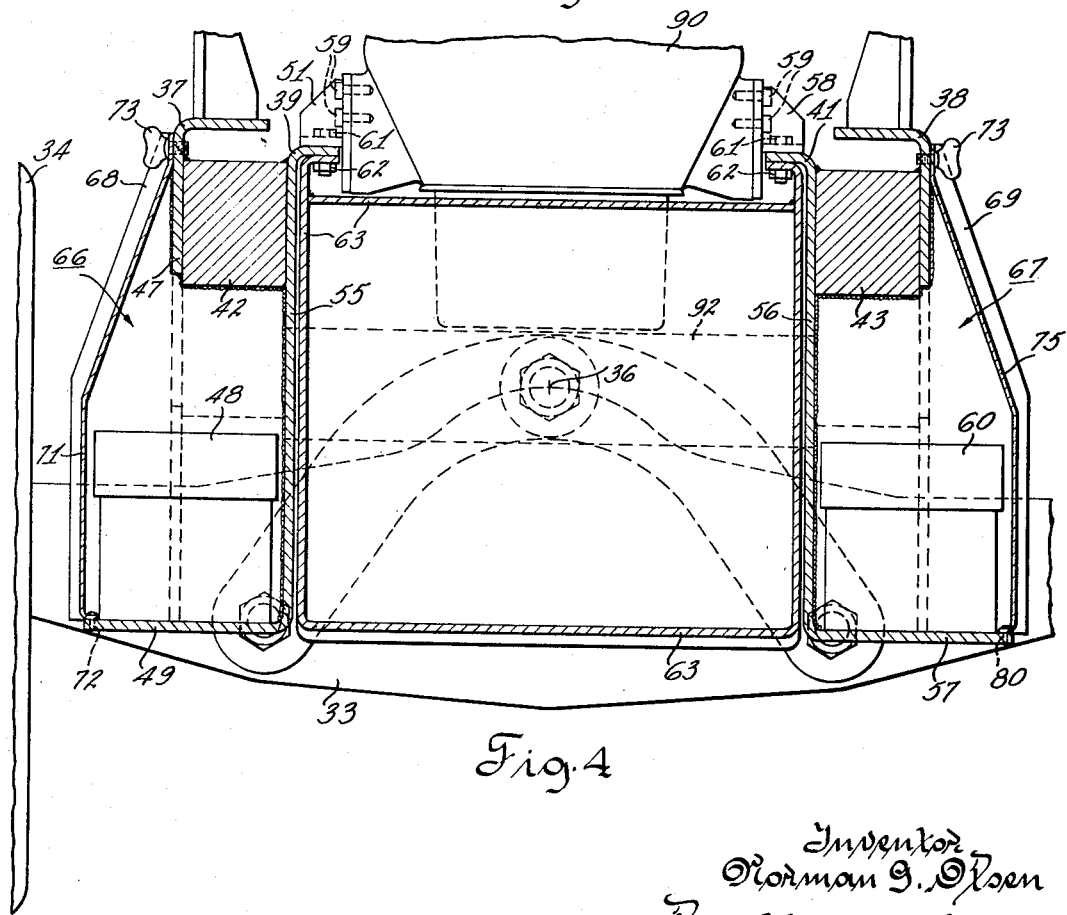
FIG. 4 is a section view taken along the line IV—IV in FIG. 2.

As viewed in FIGS. 1 and 4, the fuel tank 63 is disposed between the rear axle 33 and the bumper plate 44 in underlying relation to the vehicle engine 90. In this position the fuel tank serves as an effective counterweight and is protected by the bumper plate 44. The bumper plate 44 serves as a longitudinal outer side wall of the battery compartments 66, 67 and as a bumper for the vehicle. Additional plates of similar shape may be bolted to the bumper plate 44 to provide additional counterweight if desired. A pair of transversely and vertically extending walls 68, 69 rigidly secured as by welding to walls 49, 55 and 57, 56 provide the longitudinally inner end walls for the battery compartments. A removable side panel 71, extending between wall 68 and bumper plate 44, is provided to complete the enclosure of the battery compartment 66. The side panel 71 includes a pair of vertically disposed pins 72, only one of which is shown, at its bottom which fit in suitable vertical holes in the bottom wall 49. The upper end of the side panel 71 is secured to frame member 37 by thumb screws 73. A side panel 75 similar to panel 71 is provided for battery compartment 67.

As viewed in FIG. 4, it is evident that I have provided a laterally compact frame construction for the side by side disposition of the battery compartments and fuel tank. By placing the batteries near the rear end of the vehicle, the weight of the batteries effectively serve as counterweight for the vehicle, thus making the most effective counterweight use of the weight of necessary vehicle components. As viewed in FIG. 4, the upper portion of the end walls 68, 69 and the side panels 71, 75 slant laterally inwardly so as to avoid any interference with the rear wheels 34 as the axle 33 oscillates about its longitudinal pivot axis 36. The batteries 48, 60 are conveniently located for inspection and servicing by an operator or serviceman standing on the ground and additionally are relatively close to the vehicle components requiring electric power such as the engine starting motor, ignition and the like. Upon removing the thumb screws 73, the operator may lift the panels 71, 75 upwardly so that the pins 72, 80 will be withdrawn from the appropriate holes in the bottom walls 49, 57, respectively, and then the batteries 48, 60 can be merely slid outwardly when their removal is desired. This is a substantial convenience inasmuch as batteries for the illustrated rubber tired vehicle weigh about 130 pounds each.

The counterweights 42, 43 serve as top walls of the battery compartments and as illustrated are a little more than half the lateral width of the bottom battery support walls 49, 57. This chassis design permits advantageous use of rolled plate steel frame members 37, 38, 39, 41 which have a thickness of about one-tenth the lateral width of the counterweights 42, 43.

The embodiments of the invention for which an exclusive property or privilege is claimed are defined as follows:

1. A vehicle chassis comprising,
    a first pair of longitudinally extending and laterally spaced frame members,
    a pair of longitudinally extending and laterally spaced counterweight members adjacent the laterally inner sides of said first pair of frame members, respectively, and secured to the latter, respectively, and
    a second pair of longitudinally extending and laterally spaced frame members having
    vertically and longitudinally extending walls rigidly secured to the laterally inner sides of said counterweight members, respectively, and extending downwardly therefrom, and
    horizontally and longitudinally extending battery supports extending laterally outwardly from said walls, respectively, in underlying relation to said counterweight members.

2. The structure set forth in claim 1 wherein said second pair of frame members include engine support brackets.

3. The structure set forth in claim 1 wherein said second pair of frame members include portions adapted to releasably support a fuel tank.

4. The structure set forth in claim 1 and further comprising a transverse bumper rigidly secured to said counterweight and frame members.

5. The structure set forth in claim 1 wherein said counterweight members have a transverse width greater than one-third the transverse width of said battery supports.

6. The structure set forth in claim 1 wherein said counterweight members have a transverse width greater than four times the transverse thickness of said vertically and longitudinally extending walls.

7. The structure set forth in claim 1 and further comprising an axle secured to said chassis having a pair of laterally spaced wheels disposed on the laterally outer sides of said battery supports.

8. A vehicle comprising,
    a rear axle, a chassis supported on said rear axle and including,
    a first pair of longitudinally extending and laterally spaced frame members, each having a vertically and longitudinally extending wall portion,
    a second pair of longitudinally extending and laterally spaced frame members having
    vertically and longitudinally extending walls disposed in laterally inwardly spaced relation to said wall portions of said first pair of frame members, respectively, and extending downwardly therefrom,
    horizontally and longitudinally extending battery supports extending laterally outwardly from said walls, respectively, rearwardly of said rear axle in underlying relation to said wall portions of said first pair of frame members, and
    a pair of spacer members between and rigidly interconnecting said wall portions and walls,
    a transverse bumper rigidly secured to said frame members at the rear end of said vehicle, and
    a fuel tank releasably supported between said second pair of frame members rearwardly of said rear axle.

9. The structure set forth in claim 8 and further comprising an engine supported on said chassis in overlying relation to said fuel tank.

10. In a vehicle adapted to receive a tool attachment at one end and an engine disposed above an axle near its other end, the combination comprising:
    a vehicle chassis including, a pair of laterally spaced longitudinal frame members extending above said axle to said other end of said vehicle,
    a pair of counterweight beams secured to and disposed alongside the laterally inner sides, respectively, of said frame members, said counterweights lying above said axle and extending to said other end of said vehicle,
    a pair of secondary frame components secured to the laterally inner sides of said counterweight beams, respectively, including portions adapted to support said engine,
    vertical walls extending longitudinally to form the laterally inner side walls of a pair of battery compartments and,
    horizontal walls extending laterally outwardly from the bottom of said vertical walls to form the bottom walls of said pair of battery compartments, and
    a vertically and transversely disposed bumper plate rigidly secured to said counterweights, frame members and components, said bumper plate forming the longitudinally outer end walls of said battery compartments,
    vertically and transversely extending walls secured to said frame components, respectively, to form longitudinally inner end walls of said battery compartments, and
    a side panel releasably secured to each of said battery compartments, respectively.

11. The structure set forth in claim 10 and further comprising a fuel tank releasably secured to and disposed between said frame components at said other end of said vehicle.

12. The structure set forth in claim 10 wherein said counterweights form at least in part the top walls, respectively, of said battery compartments.

13. A vehicle chassis comprising:
a pair of laterally spaced and longitudinally extending frame members having vertical walls, respectively, extending longitudinally and over a vehicle axle to one end of said vehicle,
a pair of longitudinally extending counterweights secured to and lying along the laterally inner side of said vertical walls, respectively, said counterweights having substantial transverse width and being disposed above said axle and extending rearwardly to said one end of said vehicle,
a pair of laterally spaced and longitudinally extending frame components disposed adjacent the laterally inner sides of said counterweights, respectively, and rigidly secured thereto, respectively, said frame components being longitudinally disposed between said axle and said one end of said vehicle,
each of said components having a vertical wall portion, and a horizontal wall portion extending laterally outwardly from the bottom portion of said vertical wall portion,
a bumper plate extending across said one end of said vehicle and secured to said frame members, counterweights, and vertical and horizontal wall portions of said frame components,
a first transverse vertical wall spaced longitudinally from said bumper plate and rigidly secured to said vertical and horizontal wall portions of one of said frame components,
a second transverse vertical wall spaced longitudinally from said bumper plate and rigidly secured to said vertical and horizontal wall portions of the other of said frame components,
said walls, wall portions and bumper plate forming a pair of compartments adapted to receive batteries, and laterally outer removable side panels extending between said bumper and transverse vertical walls, respectively, to complete enclosure of said compartments.

14. The structure set forth in claim 13 wherein said frame components are adapted to releasably support a fuel tank therebetween.

References Cited

UNITED STATES PATENTS

| | | | |
|---|---|---|---|
| 1,038,615 | 9/1912 | Macrae | 180—65 X |
| 1,551,594 | 9/1925 | Walter | 180—65 |
| 2,532,057 | 11/1950 | Carlson et al. | 180—54 X |
| 2,822,056 | 2/1958 | Muller | 280—54 X |

FOREIGN PATENTS

| | | |
|---|---|---|
| 867,778 | 9/1941 | France. |
| 630,876 | 6/1936 | Germany. |
| 195,361 | 4/1923 | Great Britain. |

BENJAMIN HERSH, *Primary Examiner.*

MILTON L. SMITH, *Examiner.*